Feb. 23, 1937.   J. R. WINKLE   2,071,717
FUEL AND AIR MIXING DEVICE
Filed Dec. 23, 1933   2 Sheets-Sheet 1

INVENTOR
John R. Winkle
BY
A. B. Renwis
ATTORNEY

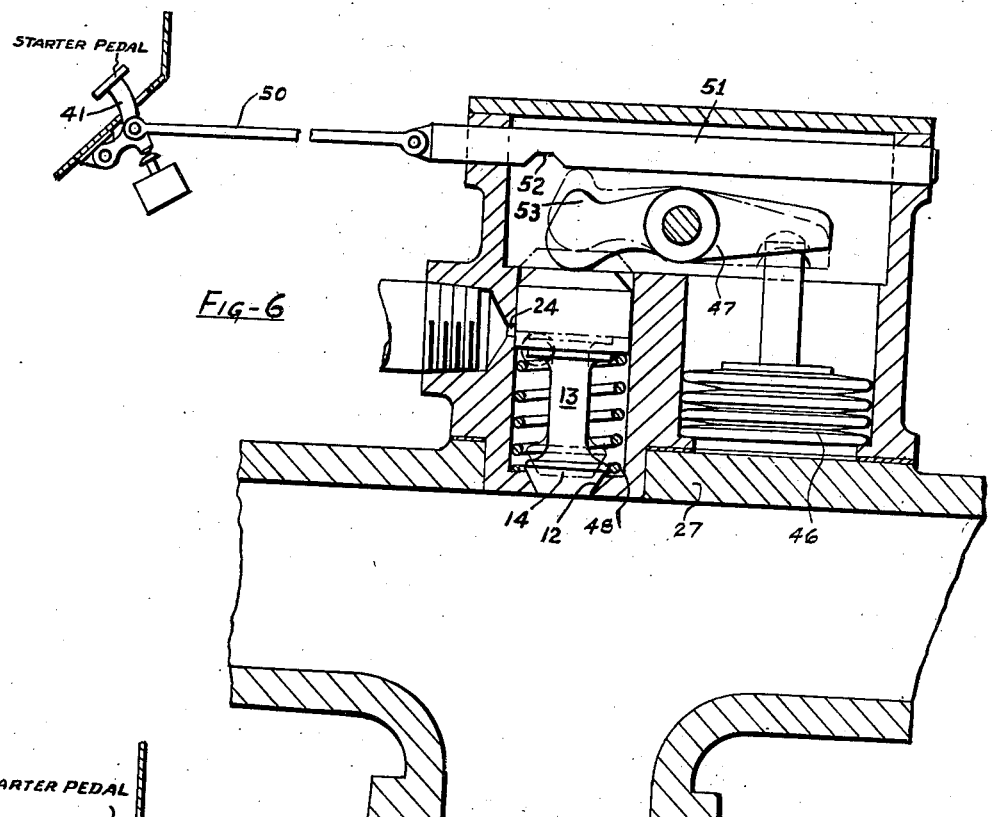
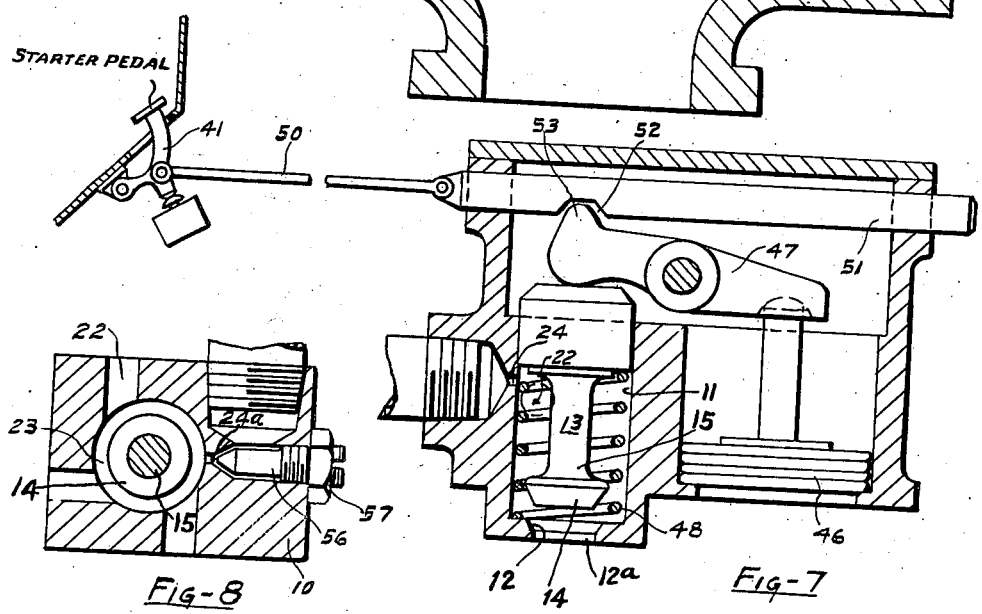

Patented Feb. 23, 1937

2,071,717

UNITED STATES PATENT OFFICE 2,071,717

FUEL AND AIR MIXING DEVICE

John R. Winkle, Ridley Park, Pa.

Application December 23, 1933, Serial No. 703,824

4 Claims. (Cl. 261—51)

My invention relates to a device for supplying a supplementary rich mixture of fuel and air to the normal mixture furnished to an internal combustion engine to facilitate starting of the latter.

More particularly, it is an object of my invention to provide a mixing device discharging to the inlet manifold of an internal combustion engine, the device having a turbulence chamber provided with ports for supplying air and fuel thereto and the outflow of mixture to the manifold and the supply of fuel to the turbulence chamber being rendered effective at the time of starting to make starting easier and also preferably to hasten warming up of the engine. With ordinary automobile engines, when starting, it is customary to modify action of the carburetor by "choking" to increase the fuel supply, but this may be subject to the objection of flooding the inlet manifold and the cylinders and consequent more difficult starting as well as dilution of the crank case oil and thinning of the oil film on the cylinder walls and about the valve stems. Furthermore, the starting motor may be used excessively with more or less pumping of oil causing fouling of spark plugs and more rapid accumulations of carbon. Also, running with an over-rich mixture causes overheating of the engine. In accordance with my invention, it is unnecessary to use the ordinary choke valve with the result that the aforementioned disadvantages do not occur and the improvement is responsible for the following advantages: the engine may be started instantly without danger of stalling on acceleration or at idling speed; the carburetor may be maintained with a desired lean adjustment for a warm condition of the engine at idling speed; the carburetor may be set for maximum economy for normal running speeds, additional torque being provided for when needed by partial opening of the device; the engine may be rapidly accelerated with the carburetor adjusted for a lean mixture by using the starting valve in conjunction with the carburetor; fuel is saved in cold weather, starting is simplified, and battery charging is reduced to a minimum; and the engine may be started on a light fuel and changed over to a heavy fuel after being warmed up.

A further object of my invention is to provide a device for supplying a supplementary mixture of fuel and of air to the mixture passing through the manifold to the engine cylinders, the device including a stationary body having a turbulence chamber provided with a valve controlling the outflow therefrom to the manifold and being provided with a fuel port and one or more air ports, a valve cooperating with the fuel port to open and close the latter and both valves being arranged to be open at the instant of starting.

A further object of my invention is to provide a device for supplying, to the mixture passing through an engine inlet manifold to the cylinders, a supplementary mixture having a high ratio of fuel to air to make starting easier, the device being effective to supply a supplementary mixture having a lower ratio of fuel to air after the engine has been started to provide for warming up of the latter.

These and other objects are effected by my invention as will be apparent from the following description and the claims taken in connection with the drawings, in which:

Figs. 6 and 7 show a further form of the device; and

Fig. 8 shows a modification of the device having means for adjusting the fuel supply.

Figure 1:
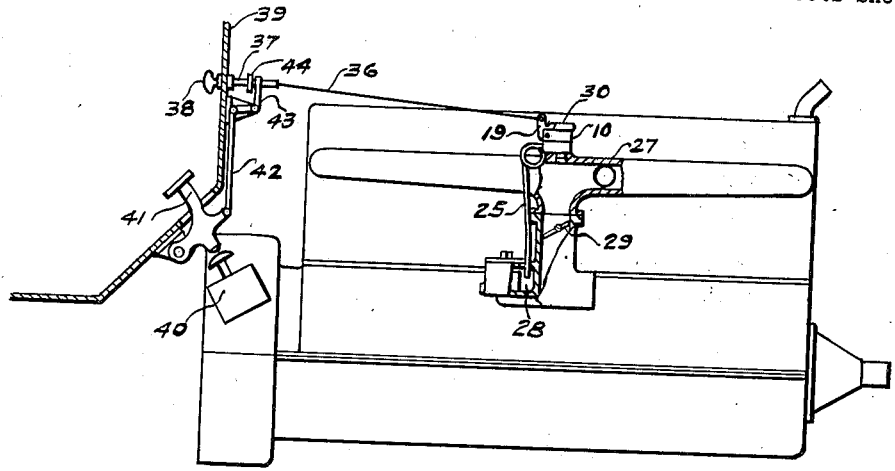
Fig. 1 is a side elevational view of an internal combustion engine having my improved supplementary mixture feeding device applied thereto.
Figures 2, 3, 4, 5:
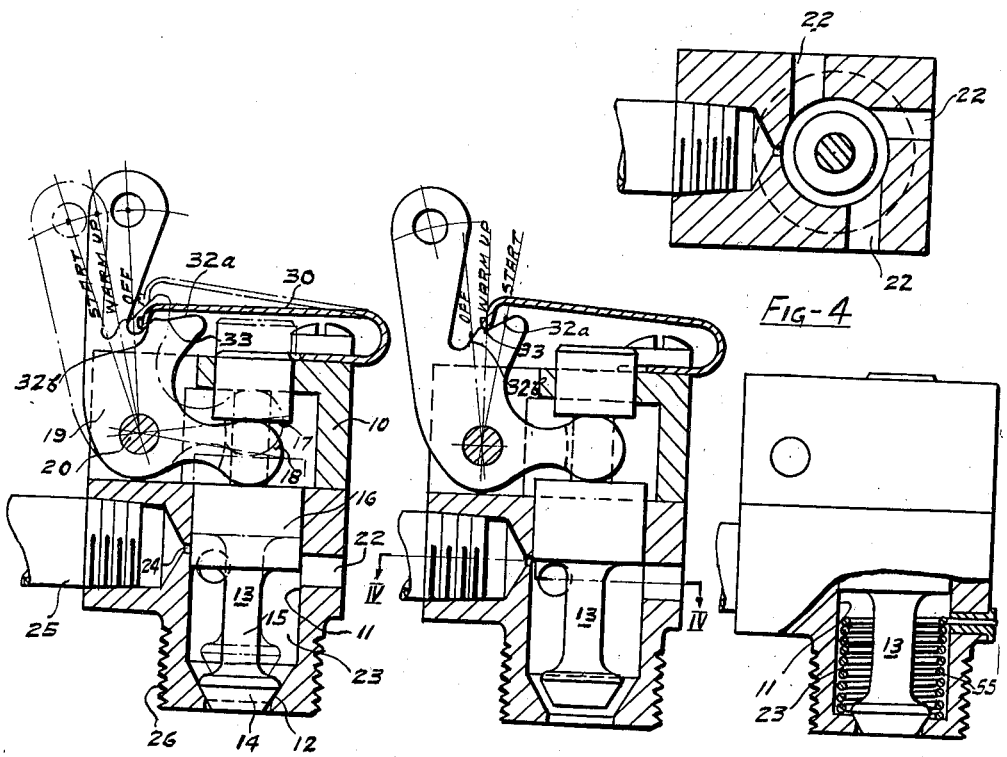
Figs. 2 and 3 are sectional views of the mixing device showing the valve member in different positions.
Fig. 4 is a sectional view taken along the line IV—IV of Fig. 3.
Fig. 5 shows a modified embodiment of the device.

Referring now to the drawings more in detail, there is shown a stationary body 10 for attachment to the engine manifold, the body having a cylindrical bore 11 terminating in a discharge port 12a formed with a valve seat 12. A movable body 13 fits within the bore and it includes a lower plug valve 14 cooperating with the seat 12 and connected by a stem 15 to the cylindrical guide portion 16 fitting the bore. As shown in Figs. 1 and 2, the movable body 13 is formed with an annular groove 17 above the guide portion 16, the groove having fitting therein the yoke 18 of the bell-crank lever 19 fulcrumed at 20 to the stationary body 10.

The stationary body 10 is provided with one or more openings 22, preferably tangentially disposed with respect to the bore 11, for supplying air to the mixing or turbulence chamber 23 provided by the bore 11 below the cylindrical guide portion 16. The stationary body also has a fuel supply port 24 for supplying fuel to the turbulence chamber, the fuel port being opened and closed by the cylindrical guide portion 16 functioning as a slide valve and being supplied with fuel by the conduit 25. The cylindrical guide portion 16 is sufficiently long to guide the movable member effectively. The spacing of the fuel inlet port 24 from the mixture discharge port and the spacing of the plug valve from the cylindrical guide portion are such that a substantial axial portion of the bore cooperates with the movable member stem to provide a turbulence chamber of annular cross section. The directions of entry of fuel and air and turning thereof for flow axially of the chamber, as well as the high velocity of flow, promote a turbulent flow condition and thorough admixture of fuel and air. Admixture is further promoted by the changes of direction required for flow between the plug valve and its seat and through the discharge port; and, in addition to these direction changes, the desired effect is further assisted by the impact condition necessarily present with inward radial convergence of the mixture stream under the plug valve and the change of direction of flow incident to entering the discharge port. The cylindrical guide portion 16 is spaced from the plug valve 14 a distance such that, with the latter seated, the fuel inlet port 24 is covered or lapped by the lower part of the guide portion, whereby, with upward movement of the movable body 13, the discharge port is first opened so that there is a tendency for a stream of air flowing through the turbulence chamber to be induced before the fuel inlet port is opened, so that, when the inlet of fuel starts, there already exists the proper condition, turbulent air flow, to secure intimate admixture of fuel and air, and this is particularly true where flow of fuel to and through the inlet port is contingent on the low pressure condition necessarily existing in the turbulence chamber with high velocity of flow of air therethrough.

The stationary body 10 has an externally threaded stem or nipple 26 fitting a tapped opening provided in the inlet manifold 27 (Fig. 1) and the fuel supply conduit 25 is connected to a suitable fuel source, for example, to the carburetor bowl 28. As soon as the engine begins to run, sub-atmospheric pressure is induced in the manifold, the degree thereof, for a given crankshaft speed, depending on the position of the throttle valve 29; and, if the plug valve element 14 is lifted from its seat 12, the pressure difference will cause air to enter the mixing or turbulence chamber 23 through the port or ports 22.

It is well known that any pressure drop of a gas is accompanied by reduction in temperature. Therefore, the air in the mixing chamber 23 is at a lower temperature than the ambient atmospheric air; and, if the temperature in the manifold 27 is higher than that in the mixing chamber, there is no tendency to precipitation of the fuel particles or vapor from the mixture entering the manifold from the mixing chamber, the supplementary rich mixture leaving the mixing chamber joining the mixture stream passing through the manifold to the cylinders and the two mixtures being thoroughly admixed to produce a resultant mixture having a sufficiently high fuel content for starting when the engine is cold.

In Fig. 2, the movable body, at 13, is shown in full lines in closed position, the plug valve element 14 being closed against the seat 12 to prevent entry of air or of mixture into the manifold from the mixing chamber 23 and the cylindrical guide portion 16 covering the fuel port 24. The wide open position of the movable body is shown in this view in dot-and-dash lines, the plug valve controlling outflow from the mixing chamber into the manifold and the cylindrical guide portion controlling the flow of fuel into the mixing chamber being in open position, the fuel port 24 being then fully open so as to provide a supplementary mixture having a maximum ratio of fuel to air. The fuel-air ratio may be reduced, as shown in Fig. 3, by having the cylindrical guide portion 16 partially cover the fuel port.

Means is associated with the movable body 13 to provide for the adjustments thereof to three positions: first, when starting, both the fuel inlet port and the mixture discharge port are fully open; second, after starting, the guide portion 16 partially covers the port 24 to restrict the flow of fuel into the mixing chamber; and, third, when normal engine running temperature is attained, the body 13 is moved so that the cylindrical guide portion 16 covers the fuel port and the plug valve portion 14 thereof engages the seat 12. If, as shown in dot-and-dash lines in Fig. 2, the bell-crank lever 19 is moved to its extreme counterclockwise position, then the movable body 13 will be moved upwardly so that the guide portion 16 thereof fully uncovers the fuel port 24 and the plug valve portion 14 thereof is moved away from its seat, this counterclockwise movement being accompanied by deflection of the spring 30 by the cam on the bell-crank lever 19. As soon as the bell-crank lever 19 is released, the force of the spring acting on the cam portion 32a causes the lever to move in a clockwise direction until the spring nose 30a enters the depression 33, whereupon movement of the lever and of the movable body 13 ceases, the parts occupying the position shown in Fig. 3 in which the fuel port is partially closed and the device supplies supplementary mixture having a reduced ratio of fuel to air suitable for warming up after starting. After the engine has been sufficiently warmed, the bell-crank lever 19 is forcibly moved further in a clockwise direction, the lower side of the depression 33 raising or deflecting the spring 30, whereupon the spring acts on the cam surface 32b to continue, or to assist in the continuance of, clockwise movement of the bell-crank lever 19 until the movable body 13 is in closed position, the spring 30 then cooperating with the cam surface 32b to hold the movable body in its closed position.

In Fig. 1, the bell-crank lever 19 is connected by a link 36 to the rod 37 of the choke button 38, the latter being arranged on the dash 39. The starting motor switch 40 is actuated in the usual way by a pedal 41, and the latter is connected, by a link 42, to one arm of a bell-crank lever 43, the other arm of the latter being arranged outwardly of the collar 44 of the rod 37. When the pedal 41 is depressed to start the engine, the bell-crank lever 43 is moved in a counter-clockwise direction to abut the collar 44 and thrust the link 36 to the left to impart clockwise movement to the bell-crank lever 19 in order to move the movable body 13 in an opening direction, this operation continuing until the movable body 13 is in fully open position, as shown in dot-and-dash lines in Fig. 2. As soon as the starting pedal 41 is released, the bell-crank lever 43 moves in a clockwise direction, whereupon the spring 30 and the cooperating cam face 32a are free to effect movement of the movable body 13 to the position shown in Fig. 3 to reduce the supplementary fuel supply rate suitably for warming up. After normal or suitable engine temperature is attained, the button 38 is pushed back to its normal position in order to effect movement of the movable body 13 to its closed position shown in full lines in Fig. 2.

In Figs. 6 and 7, there is shown a modified form of the invention wherein the movable body is moved in a closing direction against the force of the spring 48 by means of a thermostatic bellows 46, movement of the latter being transmitted to the movable body by the lever 47. The thermostatic bellows may be associated with any suitable part of the engine, for example, with the inlet manifold 27. Thus, it will be seen that, if the temperature of the engine part, such as the manifold 27, is sufficiently low, as when the engine is cold, the thermostatic bellows 46 will be contracted and the movable body 13 will occupy its wide open position (Fig. 7); however, after the engine has been started and increases in temperature, the bellows will expand (Fig. 6) and the movable body 13 will, on account thereof, be moved to closed position.

While the spring 48 and the bellows 46 may be relied upon properly to control the movable body 13, the latter not opening until the engine temperature is low enough to permit contraction of the bellows and opening of the movable body 13 by the spring 48, yet it is preferred also to have this arrangement interconnected with the engine starting mechanism. To this end, the pedal 41 is connected by a link 50 to a slide rod 51 having a notch 52 for cooperation with the nose 53 on the lever 47. When the pedal 41 is depressed, the notch 52 is alined with the nose 53, whereupon the lever 47 is free to move clockwise sufficiently to permit upward movement of the movable body, due to the spring 48, to cause the cylindrical guide portion 16 thereof to uncover fully the fuel port 24 (Fig. 7). As soon as the starter pedal 41 is released, the rod 51 moves to the left, (Fig. 6), the right-hand inclined side of the notch 52 acting as a cam on the nose 53 to cause movement of the parts from the full line position shown in Fig. 7 to the position shown in dot-and-dash lines in Fig. 6, the latter position being such that the cylindrical guide portion 16 partially covers the fuel port 24 to provide for the supplementary warming up mixture. With the attainment of sufficient engine temperature, the bellows 46 expands and causes the movable body 13 to move to closed position against the force of the spring 48.

In Fig. 5, there is shown a heating element 55 disposed in the mixing chamber 23 to assist in vaporization of the fuel.

In all of the forms of the invention so far described, the relative flow areas of the fuel port 24 and of the air port, or ports, 22 are so chosen that mixtures having the desired ratio of fuel to air are secured where the conditions and circumstances of installation remain substantially constant, fixed relative areas may be selected; however, to care for variable conditions, in Fig. 8, the fuel port 24a is shown as adjusted by a needle valve 56 threaded to the stationary body 10 and held in adjusted position by the jamb nut 57.

While the improved fuel and air mixing device has been shown as applied to the inlet manifold of an internal combustion engine for supplying to the manifold supplementary mixtures suitable for starting and warming up, it will be apparent that the device is capable of being used alone, instead of a carburetor of the usual type, for supplying a combustible mixture to an engine. Also, the device may be used to provide a mixture of air and highly volatile fuel for starting and warming up; and, after a sufficient engine temperature has been attained, the device may be closed or cut out and heavier fuel supplied to the engine.

While the improved mixing device has been shown as embodied in a plurality of forms and applied in different ways, it will be apparent that it is not so limited but is susceptible of various changes and modifications within the scope of the invention as disclosed and claimed.

What I claim is:

1. In a fuel feeding device for an internal combustion engine, a stationary body having a nipple for attachment to the inlet manifold of the engine; said body having a cylindrical guide bore, a discharge port providing communication through the nipple between the bore and the manifold, a fuel supply port communicating with the bore intermediately of the length thereof, and one or more air ports communicating with the bore and spaced from the discharge port a less distance than the fuel inlet port; said discharge port having its entrance formed to provide a valve seat; a movable body including a cylindrical guide portion fitting said bore and which functions to maintain the axis of the movable body coincident with axis of the bore, a stem having one end joined to the guide portion, and a valve joined to the end of the stem remote from the guide portion; said valve cooperating with the valve seat to open and close the discharge port and the valve and the guide portion being so spaced that, with the valve seated, the guide portion covers the fuel inlet port, whereby the discharge port is opened before the fuel inlet port; means for moving the movable body axially of the bore including a movable element in abutting relation with respect to said movable body at the side of the cylindrical guide portion remote from the valve; and manually operable means movable to render said abutment element effective to provide for movement of the movable body to separate the valve from its seat and to cause said guide portion to uncover the fuel inlet port.

2. The combination as claimed in claim 1 wherein the valve is of the plug type so that the turbulent mixture of fuel and air is constrained to change its direction of flow before going through the discharge port, whereby a more thorough admixture of fuel and air may be secured.

3. In a device for mixing fuel and air, a stationary body having a cylindrical bore terminating in an outlet in the form of a valve seat, said body having one or more air ports and a fuel supply port communicating with portions of the bore spaced axially from said valve seat and the spacing of the fuel port from said valve seat being greater than that of the air port or ports, a movable body in the bore and including a plug valve element cooperating with said seat and connected by a stem to a cylindrical guide portion fitting the bore and serving to cover and to uncover the fuel port and to guide said movable body axially of the bore, means for moving the movable body in one direction to move the plug valve element away from its seat and to move the cylindrical guide portion so as to open fully the fuel port and in the other direction to close the fuel port and to close the plug valve element against said seat, and means providing for automatic movement of the movable body, when the latter is in a fully open position, in a closing direction a sufficient extent to cause the cylindrical guide portion to partially cover the fuel port.

4. In a device for mixing fuel and air, a stationary body having a cylindrical bore terminating in an outlet in the form of a valve seat; said body having one or more air ports and a fuel port communicating with portions of the bore spaced axially from said valve seat; a movable body in the bore and including a plug valve element cooperating with said seat and connected by a stem to a cylindrical guide portion fitting the bore and serving to cover and to uncover the fuel port and to guide such movable body axially of the bore; a lever connected to the movable body and which, when moved in one direction, moves the movable body so that the plug valve element moves away from its seat and the cylindrical guide portion uncovers the fuel port and which, when moved in the other direction to a sufficient extent, causes the cylindrical guide portion to cover the fuel port and the plug valve element to move against its seat; a cam carried by the lever and having first and second cam portions separated by a depression; and a spring carried by said stationary body and deflected by said cam portions as the movable body is moved in an opening direction by said lever, said spring acting on the first cam portion, with which it is engaged when the movable body is in fully open position, to move the lever, when the latter is released, until the spring seats in the depression at which time the cylindrical guide portion partially covers the fuel port, and said spring acting, after operation of the lever to disengage it from the depression and to engage it with the second cam portion, at least to assist movement of the lever and of the movable body in a direction to close and to hold closed the plug valve element against its seat.

JOHN R. WINKLE.